(12) United States Patent
Chakrabarti et al.

(10) Patent No.: US 9,436,475 B2
(45) Date of Patent: Sep. 6, 2016

(54) SYSTEM AND METHOD FOR EXECUTING SEQUENTIAL CODE USING A GROUP OF THREADS AND SINGLE-INSTRUCTION, MULTIPLE-THREAD PROCESSOR INCORPORATING THE SAME

(71) Applicant: Nvidia Corporation, Santa Clara, CA (US)

(72) Inventors: Gautam Chakrabarti, Santa Clara, CA (US); Yuan Lin, Santa Clara, CA (US); Jaydeep Marathe, Santa Clara, CA (US); Okwan Kwon, West Lafayette, IN (US); Amit Sabne, West Lafayette, IN (US)

(73) Assignee: NVIDIA CORPORATION, Santa Clara, CA (US)

( * ) Notice: Subject to any disclaimer, the term of this patent is extended or adjusted under 35 U.S.C. 154(b) by 482 days.

(21) Appl. No.: 13/723,981

(22) Filed: Dec. 21, 2012

(65) Prior Publication Data

US 2014/0129812 A1   May 8, 2014

Related U.S. Application Data

(60) Provisional application No. 61/722,661, filed on Nov. 5, 2012.

(51) Int. Cl.

| G06F 9/38 | (2006.01) |
|---|---|
| G06F 12/02 | (2006.01) |
| G06F 9/45 | (2006.01) |
| G06F 9/52 | (2006.01) |
| G06F 9/50 | (2006.01) |

(52) U.S. Cl.
CPC . *G06F 9/38* (2013.01); *G06F 8/40* (2013.01); *G06F 9/5016* (2013.01); *G06F 9/52* (2013.01); *G06F 9/522* (2013.01); *G06F 12/02* (2013.01)

(58) Field of Classification Search
None
See application file for complete search history.

(56) References Cited

U.S. PATENT DOCUMENTS

| 5,875,464 | A | 2/1999 | Kirk |
|---|---|---|---|
| 6,088,770 | A | 7/2000 | Tarui et al. |
| 6,609,193 | B1 | 8/2003 | Douglas et al. |
| 7,086,063 | B1 | 8/2006 | Ousterhout et al. |
| 7,856,541 | B2 | 12/2010 | Kaneda et al. |
| 8,250,555 | B1 | 8/2012 | Lee et al. |
| 8,335,892 | B1 | 12/2012 | Minkin et al. |
| 8,397,013 | B1 | 3/2013 | Rosenband et al. |
| 8,516,483 | B2 | 8/2013 | Chinya et al. |
| 8,547,385 | B2 | 10/2013 | Jiao |

(Continued)

FOREIGN PATENT DOCUMENTS

| CN | 1725176 A | 1/2006 |
|---|---|---|
| CN | 101176066 A | 5/2008 |

(Continued)

*Primary Examiner* — William B Partridge

(57) ABSTRACT

A system and method for executing sequential code in the context of a single-instruction, multiple-thread (SIMT) processor. In one embodiment, the system includes: (1) a pipeline control unit operable to create a group of counterpart threads of the sequential code, one of the counterpart threads being a master thread, remaining ones of the counterpart threads being slave threads and (2) lanes operable to: (2a) execute certain instructions of the sequential code only in the master thread, corresponding instructions in the slave threads being predicated upon the certain instructions and (2b) broadcast branch conditions in the master thread to the slave threads.

17 Claims, 2 Drawing Sheets

(56) References Cited

U.S. PATENT DOCUMENTS

| | | |
|---|---|---|
| 8,615,646 B2 | 12/2013 | Nickolls et al. |
| 8,683,132 B1 | 3/2014 | Danilak |
| 2002/0029357 A1* | 3/2002 | Charnell et al. ............... 714/9 |
| 2003/0018684 A1* | 1/2003 | Ohsawa et al. ............ 709/102 |
| 2005/0125774 A1 | 6/2005 | Barsness et al. |
| 2006/0095675 A1 | 5/2006 | Yang et al. |
| 2007/0136523 A1 | 6/2007 | Bonella et al. |
| 2007/0143582 A1 | 6/2007 | Coon et al. |
| 2007/0294512 A1* | 12/2007 | Crutchfield et al. ........ 712/200 |
| 2008/0052466 A1 | 2/2008 | Zulauf |
| 2008/0126716 A1 | 5/2008 | Daniels |
| 2009/0006758 A1 | 1/2009 | Chung et al. |
| 2009/0013323 A1* | 1/2009 | May et al. .................... 718/104 |
| 2009/0031290 A1 | 1/2009 | Feng et al. |
| 2009/0100244 A1 | 4/2009 | Chang et al. |
| 2010/0079454 A1 | 4/2010 | Legakis et al. |
| 2010/0281230 A1 | 11/2010 | Rabii et al. |
| 2011/0022672 A1 | 1/2011 | Chang et al. |
| 2011/0072214 A1 | 3/2011 | Li et al. |
| 2011/0072438 A1 | 3/2011 | Fiyak et al. |
| 2011/0125974 A1 | 5/2011 | Anderson |
| 2011/0191522 A1 | 8/2011 | Condict et al. |
| 2011/0265068 A1* | 10/2011 | Elnozahy et al. ............ 717/149 |
| 2011/0320804 A1 | 12/2011 | Chan et al. |
| 2012/0072652 A1 | 3/2012 | Celis et al. |
| 2012/0089792 A1 | 4/2012 | Fahs et al. |
| 2012/0131309 A1 | 5/2012 | Johnson et al. |
| 2012/0137055 A1 | 5/2012 | Lee et al. |
| 2012/0137099 A1 | 5/2012 | Shibayama et al. |
| 2012/0151179 A1 | 6/2012 | Gaertner et al. |
| 2012/0191953 A1 | 7/2012 | Eichenberger et al. |
| 2012/0204065 A1 | 8/2012 | Tsafrir et al. |
| 2012/0254530 A1 | 10/2012 | Tagaya |
| 2013/0263153 A1 | 10/2013 | Gschwind |
| 2014/0007114 A1 | 1/2014 | Wang et al. |
| 2014/0129783 A1 | 5/2014 | Marathe et al. |
| 2014/0130021 A1 | 5/2014 | Lin et al. |
| 2014/0130052 A1 | 5/2014 | Lin et al. |

FOREIGN PATENT DOCUMENTS

| | | |
|---|---|---|
| CN | 101819675 A | 9/2010 |
| TW | 201140447 A | 11/2011 |
| TW | 201220246 A | 5/2012 |

\* cited by examiner

SYSTEM AND METHOD FOR EXECUTING SEQUENTIAL CODE USING A GROUP OF THREADS AND SINGLE-INSTRUCTION, MULTIPLE-THREAD PROCESSOR INCORPORATING THE SAME

CROSS-REFERENCE TO RELATED APPLICATION

This application claims the benefit of U.S. Provisional Application Ser. No. 61/722,661, filed by Lin, et al., on Nov. 5, 2012, entitled "Executing Sequential Code Using a Group of Threads," commonly assigned with this application and incorporated herein by reference.

TECHNICAL FIELD

This application is directed, in general, to parallel processors and, more specifically, to a system and method for executing sequential code using a group of threads and a single-instruction, multiple-thread (SIMT) processor incorporating the system or the method.

BACKGROUND

As those skilled in the pertinent art are aware, applications may be executed in parallel to increase their performance. Data parallel applications carry out the same process concurrently on different data. Task parallel applications carry out different processes concurrently on the same data. Static parallel applications are applications having a degree of parallelism that can be determined before they execute. In contrast, the parallelism achievable by dynamic parallel applications can only be determined as they are executing. Whether the application is data or task parallel, or static or dynamic parallel, it may be executed in a pipeline which is often the case for graphics applications.

A SIMT processor is particularly adept at executing data parallel applications. A pipeline control unit in the SIMT processor creates groups of threads of execution and schedules them for execution, during which all threads in the group execute the same instruction concurrently. In one particular processor, each group has 32 threads, corresponding to 32 execution pipelines, or lanes, in the SIMT processor.

Parallel applications typically contain regions of sequential code and parallel code. Sequential code cannot be executed in parallel and so is executed in a single thread. When parallel code is encountered, the pipeline control unit splits execution, creating groups of worker threads for parallel execution of the parallel code. When sequential code is again encountered, the pipeline control unit joins the results of the parallel execution, creates another single thread for the sequential code, and execution proceeds.

It is important to synchronize the threads in a group. Synchronizing in part involves conforming the states of local memories associated with each lane. It has been found that synchronizing can be made faster if, while executing sequential code, a counterpart thread of the sequential code is executed in each of the lanes. The local memory states are thus assumed to be already conformed if execution is later split.

SUMMARY

One aspect provides a system for executing sequential code. In one embodiment, the system includes: (1) a pipeline control unit operable to create a group of counterpart threads of the sequential code, one of the counterpart threads being a master thread, remaining ones of the counterpart threads being slave threads and (2) lanes operable to: (2a) execute certain instructions of the sequential code only in the master thread, corresponding instructions in the slave threads being predicated upon the certain instructions and (2b) broadcast branch conditions in the master thread to the slave threads.

Another aspect provides a method of executing sequential code. In one embodiment, the method includes: (1) creating a group of counterpart threads of the sequential code, one of the counterpart threads being a master thread, remaining ones of the counterpart threads being slave threads, (2) executing certain instructions of the sequential code only in the master thread, corresponding instructions in the slave threads being predicated upon the certain instructions and (3) broadcasting branch conditions in the master thread to the slave threads.

Yet another aspect provides a SIMT processor. In one embodiment, the SIMT processor includes: (1) lanes, (2) local memories associated with corresponding ones of the lanes, (3) shared memory device by the lanes and (4) a pipeline control unit operable to create a group of counterpart threads of the sequential code and cause the group to be executed in the lanes, one of the counterpart threads being a master thread, remaining ones of the counterpart threads being slave threads. The lanes are operable to: (1) execute certain instructions of the sequential code only in the master thread, corresponding instructions in the slave threads being predicated upon the certain instructions and (2) broadcast branch conditions in the master thread to the slave threads.

BRIEF DESCRIPTION

Reference is now made to the following descriptions taken in conjunction with the accompanying drawings, in which.

DETAILED DESCRIPTION

Figure 1:
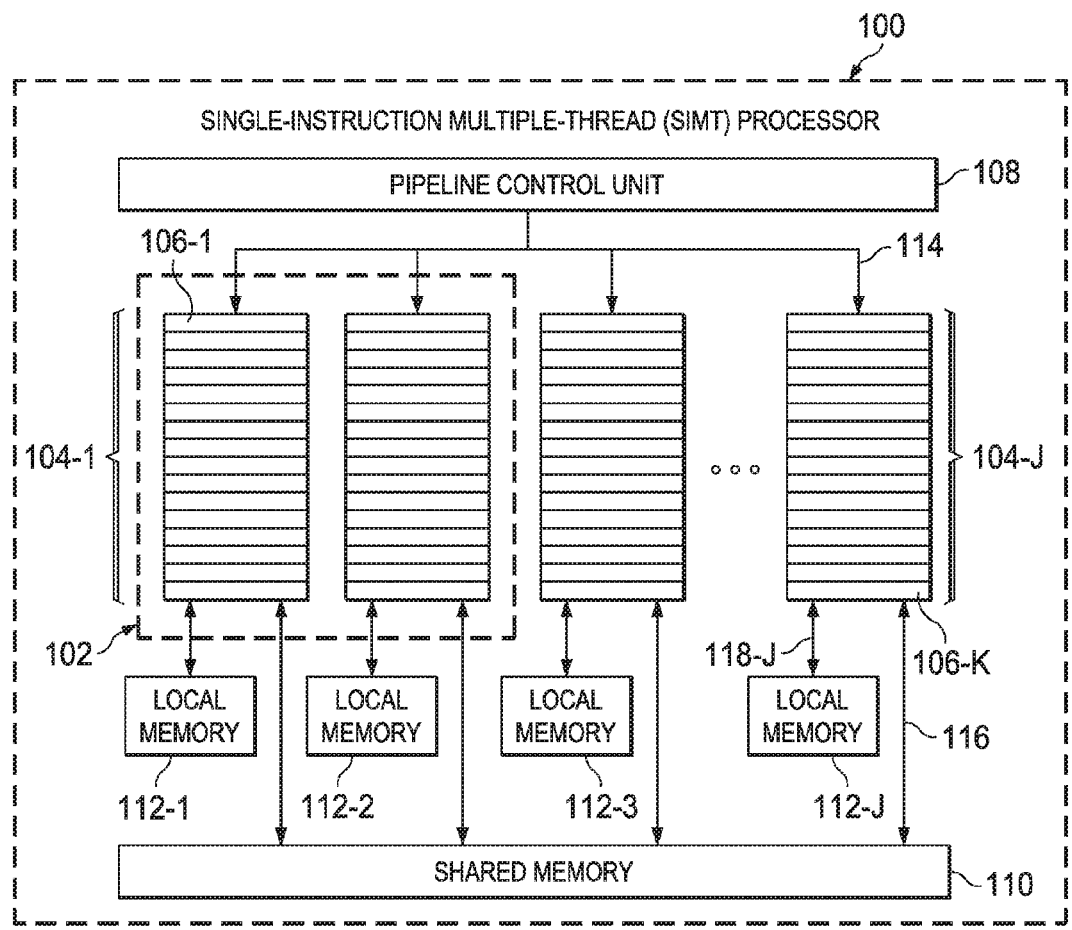
FIG. 1 is a block diagram of a SIMT processor operable to contain or carry out a system or method for executing sequential code using a group of threads.

As stated above, it has been found that the process of synchronizing among the lanes, or cores, of a SIMT processor can be made faster if a counterpart thread of the sequential code is executed in each of the lanes. Because the counterpart threads are of the same code (i.e., the same instructions in the same order), and because the local memory states are conformed when the counterpart threads of the code begin execution, the assumption that the local memory states will remain conformed seems a foregone conclusion. However, it is realized herein that conditions may exist under which the memory states diverge.

Assume, as one example, the counterpart threads of the sequential code are to execute the same load instruction. The location of the memory to load is specified by either a register or an address. If by a register, the value of the register may vary per thread because each thread has its own copy of the register. If by an address, the address value may point to different thread-local memory locations in the system. In either case, each thread may load different values from a variety of memory locations, causing thread-local memory states to diverge. Were the counterpart threads then to branch based upon the loaded data, some branches taken would be correct, and others would be erroneous.

Similarly, assume the counterpart threads of the sequential code are to execute the same store instruction. The memory being stored to varies per thread for the same reasons as described for the load instruction above. Memory locations not modified in the sequential execution would be erroneously modified in the parallel execution.

As another example, assume that the counterpart threads of the sequential code are to store data concurrently to the same location in shared memory. The shared memory could again be overwhelmed and corrupted as a consequence. The problems highlighted in both of these examples are sometimes experienced in vector operations.

As yet another example, assume an exception handler is a shared resource among the various lanes. Regions of sequential code often include numerous instructions that could potentially cause exceptions to occur. While executing these instructions in parallel, were an exception to arise, the parallel processes could throw simultaneous exceptions and overwhelm the shared exception handler, which would expect one exception, at most, and possibly none at all.

It is therefore realized herein that the assumption that the local memory states will necessarily remain conformed while counterpart threads of sequential code are executing is untenable. It is further realized herein that certain operations, including not only loads from and stores to shared memory but divisions and other instructions that potentially cause exceptions, can corrupt shared memory or cause local memory states to diverge as a "side effect." It is yet further realized herein a mechanism is needed to ensure semantics of sequential code are not distorted by diverging thread-local memory states.

Accordingly, introduced herein are various embodiments of a system and method for executing sequential code using a group of threads. Viewed at a very high level, the various embodiments cause counterpart-thread execution of sequential code to emulate master-thread execution of sequential code.

According to the various embodiments, one of the counterpart threads is designated a master thread, and the other threads are designated slave threads. Certain instructions (typically those that may or do employ shared resources) in the slave threads are then predicated on corresponding instructions in the master thread, and only the corresponding instructions in the master thread are executed. If a branch instruction is encountered in the master thread, the branch conditions in the master thread are then broadcast to the slave threads.

FIG. 1 is a block diagram of a SIMT processor 100 operable to contain or carry out a system or method for executing sequential code using a group of threads. SIMT processor 100 includes multiple thread processors, or cores 106, organized into thread groups 104, or "warps." SIMT processor 100 contains J thread groups 104-1 through 104-J, each having K cores 106-1 through 106-K. In certain embodiments, thread groups 104-1 through 104-J may be further organized into one or more thread blocks 102. One specific embodiment has thirty-two cores 106 per thread group 104. Other embodiments may include as few as four cores in a thread group and as many as several tens of thousands. Certain embodiments organize cores 106 into a single thread group 104, while other embodiments may have hundreds or even thousands of thread groups 104. Alternate embodiments of SIMT processor 100 may organize cores 106 into thread groups 104 only, omitting the thread block organization level.

SIMT processor 100 further includes a pipeline control unit 108, shared memory 110 and an array of local memory 112-1 through 112-J associated with thread groups 104-1 through 104-J. Pipeline control unit 108 distributes tasks to the various thread groups 104-1 through 104-J over a data bus 114. Pipeline control unit 108 creates, manages, schedules, executes and provides a mechanism to synchronize thread groups 104-1 through 104-J. Certain embodiments of SIMT processor 100 are found within a graphics processing unit (GPU). Some GPUs provide a group synchronization instruction, such as bar.sync in GPUs manufactured by Nvidia Corporation of Santa Clara, Calif. Certain embodiments support execution of divergent conditional branches by thread groups. Given a branch, some threads within a thread group 104 will take the branch because a branch condition predicate evaluates to "true," and other threads fall through to the next instruction because the branch condition predicate evaluates to "false." Pipeline control unit 108 tracks active threads by first executing one of the paths, either the branch taken or the branch not-taken, and then the alternate path, enabling the appropriate threads for each.

Continuing the embodiment of FIG. 1, cores 106 within a thread group execute in parallel with each other. Thread groups 104-1 through 104-J communicate with shared memory 110 over a memory bus 116. Thread groups 104-1 through 104-J respectively communicate with local memory 112-1 through 112-J over local buses 118-1 through 118-J. For example, a thread group 104-J utilizes local memory 112-J by communicating over a local bus 118-J. Certain embodiments of SIMT processor 100 allocate a shared portion of shared memory 110 to each thread block 102 and allow access to shared portions of shared memory 110 by all thread groups 104 within a thread block 102. Certain embodiments include thread groups 104 that use only local memory 112. Many other embodiments include thread groups 104 that balance use of local memory 112 and shared memory 110.

The embodiment of FIG. 1 includes a master thread group 104-1. Each of the remaining thread groups 104-2 through 104-J are considered "worker" thread groups. The master thread group 104-1 includes numerous cores, one of which is a master core 106-1, which ultimately executes a master thread. Programs executed on SIMT processor 100 are structured as a sequence of kernels. Typically, each kernel completes execution before the next kernel begins. In certain embodiments, SIMT 100 may execute multiple kernels in parallel, depending on the size of the kernels. Each kernel is organized as a hierarchy of threads to be executed on the cores 106.

Figure 2:
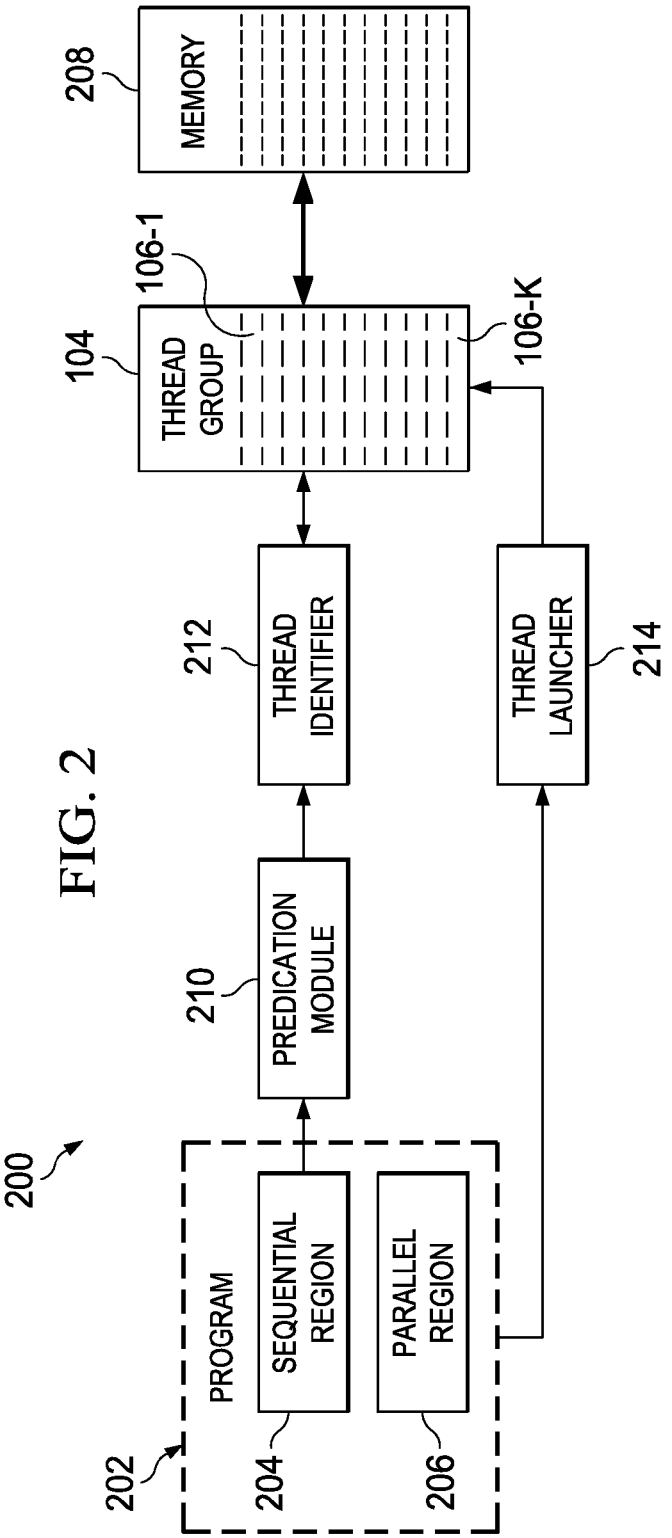
FIG. 2 is a block diagram of one embodiment of a system for executing sequential code using a group of threads.

FIG. 2 is a block diagram of one embodiment of a system 200 for executing sequential code using a group of threads. System 200 includes a program 202 having a sequential region 204 and parallel region 206, a memory 208, a predication module 210, a thread identifier 212, a thread launcher 214 and a thread group 104. Thread group 104, of FIG. 1, consists of K cores 106-1 through 106-K, or lanes.

Thread group 104 is coupled to memory 208, which is allocated into sections correlating to each of the cores 106-1 through 106-K. Thread launcher 214 creates processing threads in cores 106-1 through 106-K. One core, often the first, core 106-1, is designated to execute the master thread. The remaining threads are worker threads. Traditionally, the master thread executes the sequential region 204 of the program 202, and the parallel region 206 is traditionally executed in the worker threads. When the parallel region 206 is reached, thread launcher 214 creates the necessary worker threads to execute the parallel processing.

In the embodiment of FIG. 2, the sequential region 204 of program 202 is processed by predication module 210. The predication module designates certain operations be carried out only on the master thread. The predication is implemented by thread identifier 212, which identifies the master thread for processing the certain operations. The balance of the sequential region 204 is executed in all threads in the thread group 104. When the worker threads reach a predicated segment of the sequential region 204, the worker threads skip the predicated segment and continue on until a branch statement is reached. When the worker threads reach a branch statement, they wait for direction from the master thread, because only the master thread can reliably evaluate the branch conditions. Once the master thread processes the predicated segment, reaches the branch statement and evaluates the branch conditions, the master thread broadcasts the branch conditions to each of the worker threads. The worker threads can then resume progress through the sequential region 204 of program 202.

Figure 3:
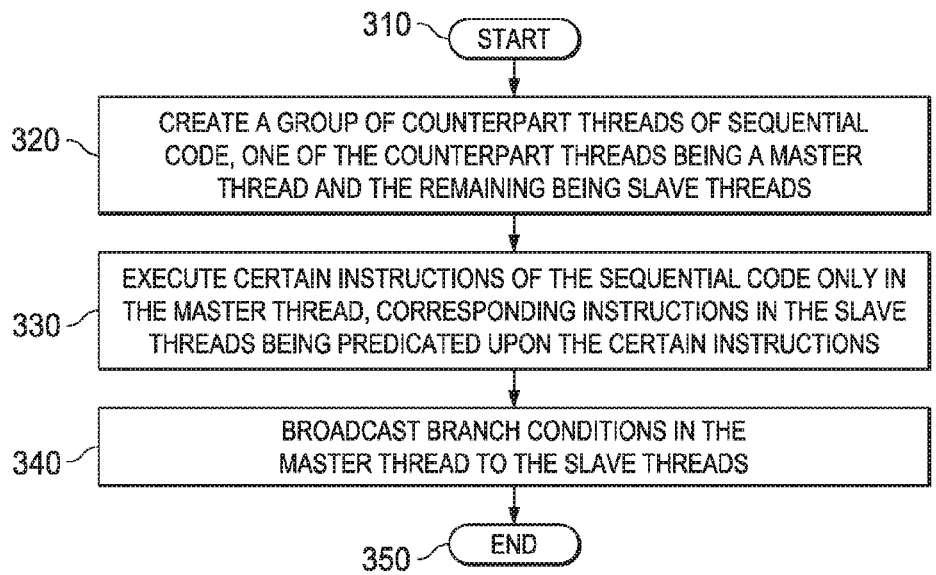
FIG. 3 is a flow diagram of one embodiment of a method of executing sequential code using a group of threads.

FIG. 3 is a flow diagram of one embodiment of a method of executing sequential code using a group of threads. The sequential code may be part of a vector operation, part of a program developed according to an OpenMP or OpenACC programming model, or associated with another application of any type whatsoever.

The method begins in a start step 310. In a step 320, a group of counterpart threads of the sequential code is created, one of the counterpart threads being a master thread, remaining ones of the counterpart threads being slave threads. In a step 330, certain instructions of the sequential code are executed only in the master thread, corresponding instructions in the slave threads being predicated upon the certain instructions. In various embodiments, the certain instructions may be load instructions, store instructions, divide instructions, or any other instruction that may produce, or may be perceived as producing, side effects. In one embodiment, the corresponding instructions are predicated using a condition based on a thread identifier.

In a step 340, branch conditions in the master thread are broadcast to the slave threads. In one embodiment, the branch conditions are broadcast before execution of a branch instruction in the master thread, and the corresponding branch instructions are executed in the slave threads only after the broadcast. The method ends in an end step 350.

Those skilled in the art to which this application relates will appreciate that other and further additions, deletions, substitutions and modifications may be made to the described embodiments.

What is claimed is:

1. A system for executing sequential code, comprising:
    a pipeline control unit configured to create a group of counterpart threads of said sequential code in a single instruction, multiple thread (SIMT) processor, one of said counterpart threads being a master thread, remaining ones of said counterpart threads being slave threads; and
    lanes configured to:
        execute certain instructions of said sequential code only in said master thread, corresponding instructions in said slave threads being predicated upon said certain instructions, and
        broadcast branch conditions in said master thread to said slave threads,
        wherein all of said lanes of said SIMT processor execute in lock-step.

2. The system as recited in claim 1 wherein local memories associated with lanes executing said slave threads are further configured to store said branch conditions.

3. The system as recited in claim 1 wherein said certain instructions are selected from the group consisting of:
    load instructions,
    store instructions, and
    exception inducing instructions.

4. The system as recited in claim 1 wherein a lane executing said master thread is further configured to broadcast said branch conditions before execution of a branch instruction in said master thread and lanes executing said slave threads further configured to execute corresponding branch instructions in said slave threads only after said lane broadcasts said branch conditions.

5. The system as recited in claim 1 wherein said pipeline control unit is further configured to predicate said corresponding instructions using a condition based on a thread identifier.

6. The system as recited in claim 1 wherein said sequential code is part of a vector operation.

7. A method of executing sequential code, comprising:
    creating a group of counterpart threads of said sequential code in a single instruction, multiple thread (SIMT) processor, one of said counterpart threads being a master thread, remaining ones of said counterpart threads being slave threads;
    executing certain instructions of said sequential code only in said master thread, corresponding instructions in said slave threads being predicated upon said certain instructions; and
    broadcasting branch conditions in said master thread to said slave threads,
    wherein lanes of said SIMT processor execute in lock-step.

8. The method as recited in claim 7 further comprising storing said branch conditions in local memories associated with said slave threads.

9. The method as recited in claim 7 wherein said certain instructions are selected from the group consisting of:
    load instructions,
    store instructions, and
    exception inducing instructions.

10. The method as recited in claim 7 wherein said broadcasting is carried out before execution of a branch instruction in said master thread, said method further comprising:
    executing corresponding branch instructions in said slave threads only after said broadcasting is carried out.

11. The method as recited in claim 7 wherein said executing comprises predicating said corresponding instructions using a condition based on a thread identifier.

12. The method as recited in claim 7 wherein said sequential code is part of a vector operation.

13. A single-instruction, multiple-thread (SIMT) processor, comprising:
    lanes;
    local memories associated with corresponding ones of said lanes;
    shared memory device by said lanes; and
    a pipeline control unit configured to create a group of counterpart threads of said sequential code and cause said group to be executed in said lanes, one of said counterpart threads being a master thread, remaining ones of said counterpart threads being slave threads, said lanes configured to:
  execute certain instructions of said sequential code only in said master thread, corresponding instructions in said slave threads being predicated upon said certain instructions, and
  broadcast branch conditions in said master thread to said slave threads,
  wherein all of said lanes operate of said SIMT processor execute in lock-step.

14. The SIMT processor as recited in claim 13 wherein said local memories associated with lanes executing said slave threads are further configured to store said branch conditions.

15. The SIMT processor as recited in claim 13 wherein said certain instructions are selected from the group consisting of:
  load instructions,
  store instructions, and
  exception inducing instructions.

16. The SIMT processor as recited in claim 13 wherein a lane executing said master thread is further configured to broadcast said branch conditions before execution of a branch instruction in said master thread and lanes executing said slave threads further configured to execute corresponding branch instructions in said slave threads only after said lane broadcasts said branch conditions.

17. The SIMT processor as recited in claim 13 wherein said pipeline control unit is further configured to predicate said corresponding instructions using a condition based on a thread identifier.

* * * * *